2,727,011

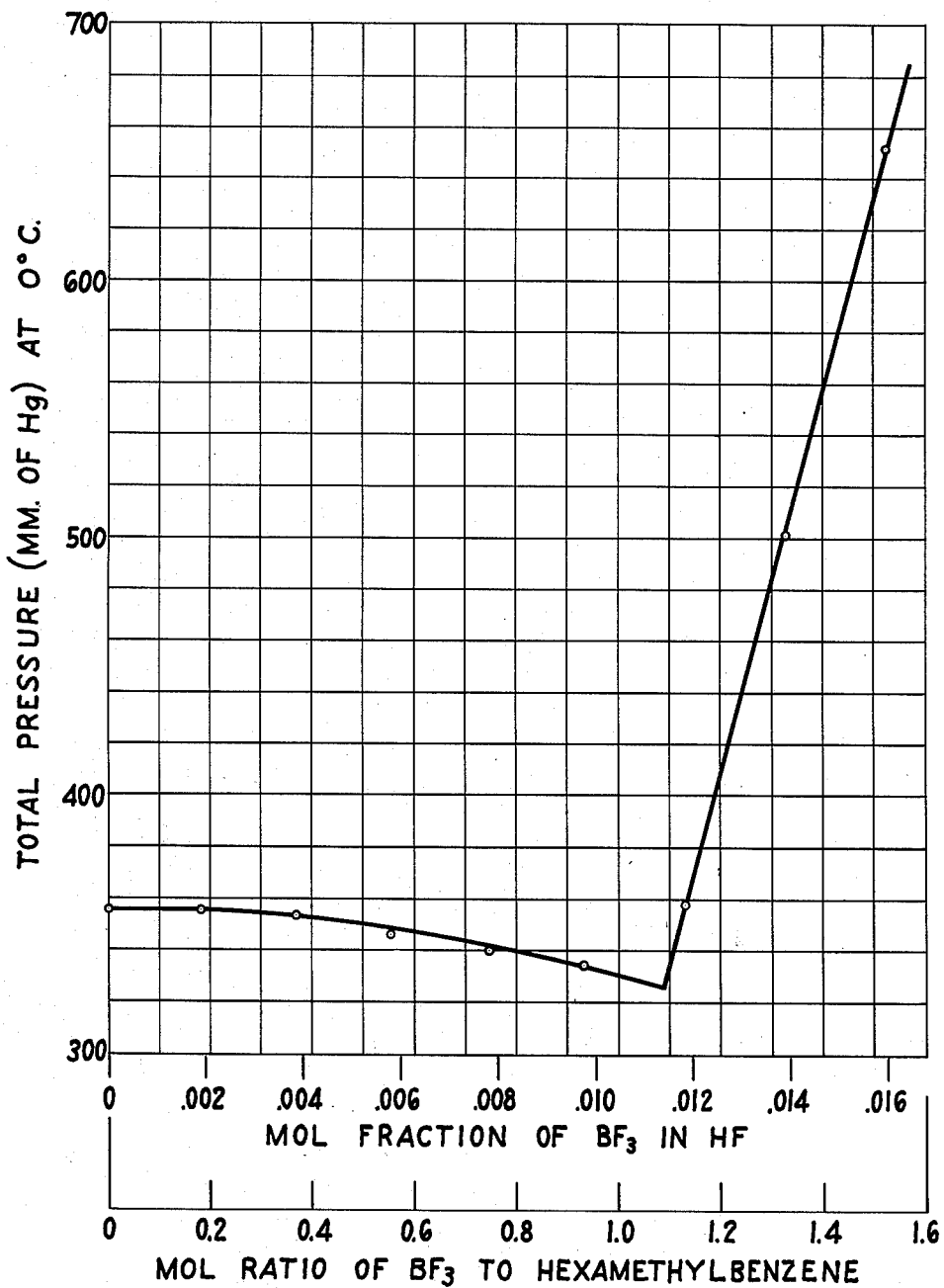

HEXAMETHYLBENZENE BF₃ HF COMPLEX AND SOLUTION THEREOF

David A. McCaulay, Chicago, Ill., and Arthur P. Lien, Highland, Ind., assignors to Standard Oil Company, Chicago, Ill., a corporation of Indiana Continuation of application Serial No. 146,776, February 28, 1950. This application July 23, 1952, Serial No. 300,440

2 Claims. (Cl. 252—428)

This invention relates to a novel complex compound and more particularly, to the complex compound derived by the reaction of hexamethylbenzene, $BF_3$ and HF.

One object of the present invention is to provide a novel complex compound derived from hexamethylbenzene, $BF_3$ and HF. Another object of this invention is to provide a solution of a complex compound derived from hexamethylbenzene, $BF_3$ and HF in a solvent consisting essentially of liquid hydrogen fluoride. Another object of this invention is to provide processes for the preparation of a complex compound of hexamethylbenzene, $BF_3$ and HF. An additional object of the invention is to provide various uses for the complex compound of hexamethylbenzene, $BF_3$ and HF.

Complex compounds derived from various alkyl aromatic hydrocarbons, $BF_3$ and HF have previously been prepared or their preparation has been suggested. For example, U. S. Patent 2,427,009 of Arthur P. Lien and Bernard L. Evering proposes the absorption of $BF_3$ in a mixture of HF and an alkyl aromatic hydrocarbon containing 7 to 11 carbon atoms per molecule in order to form an HF-soluble complex compound. U. S. Patent 2,397,495 of Arthur P. Lien and Bernard H. Shoemaker, discloses complexes derived from $BF_3$, HF and an aromatic hydrocarbon such as toluene, an ethyltoluene and diethylbenzenes. It was heretofore believed requisite that an aromatic hydrocarbon contain at least one unsubstituted nuclear carbon atom to permit the formation of a complex compound by reaction with $BF_3$ and HF.

We have made the surprising discovery that hexamethylbenzene, although it contains no unsubstituted nuclear carbon atom in the benzene ring, reacts rapidly and readily with $BF_3$ and HF to produce a complex, having the molecular formula hexamethylbenzene.$BF_3$.HF, which is readily soluble in free, or excess, liquid hydrogen fluoride. We have, moreover, observed that the complex compound derived from hexamethylbenzene, $BF_3$ and HF is surprisingly stable. If the reaction of an aromatic hydrocarbon with $BF_3$ and HF to produce a complex compound be regarded as a manifestation of basicity (electron-donating character) then, as will be discussed in detail hereinafter, it appears that the relative basicity of hexamethylbenzene is of the order of 10 times the basicity of the next most basic methyl-substituted benzene and of the order of 44,500 times the basicity of the first methyl-substituted benzene whose basicity can be readily measured by its reaction with $BF_3$ and HF (p-xylene). The complex compound of hexamethylbenzene, $BF_3$ and HF is characterized by its relatively low vapor pressure at moderate temperatures, which indicates that at these temperatures it is substantially undissociated, since the free HF and $BF_3$ which are formed upon dissociation have relatively high vapor pressures. The novel complex compound of this invention, preferably in the form of its solution in free liquid hydrogen fluoride, is adaptable to a number of uses, which will be discussed hereinafter. Further consideration will be devoted at this point to methods for the preparation of the hexamethylbenzene complex.

Hexamethylbenzene reacts in the solid state or in solution in other hydrocarbons with $BF_3$ and HF by an exothermic reaction. The rate of the reaction is very rapid and it appears to be limited only by the rate of mixing. In large scale preparations it would be desirable to remove at least a part of the heat of reaction in order to maintain the temperature of the reaction mixture within the desired limits to prevent excessive vaporization of HF and the development of excessively high pressures. The order of mixing the reagents does not appear to affect the reaction. The presence of an excess of hydrogen fluoride, i. e., more than 1 mol per mol of hexamethylbenzene reacting is desirable, since it can serve as a dispersing medium for solid hexamethylbenzene and it functions as a solvent for the complex compound of hexamethylbenzene, $BF_3$ and HF. In general, we may employ between about 5 and about 20 mols of HF per mol of hexamethylbenzene, although even more may be used. Boron fluoride is used in the proportion of about 1 mol per mol of hexamethylbenzene, although it is obvious that more can be employed. The reaction is usually effected at temperatures between about 20° C. and about 50° C., although temperatures between about —50° C. and about 100° C. can be employed. Ordinarily, reaction is effected at about room temperature. Sufficient pressure is maintained in the reaction zone to liquefy at least a substantial proportion of the hydrogen fluoride therein. Usually pressures between about 0 and about 50 p. s. i. g. are employed, although the reaction pressure does not appear to be a critical variable provided that it be sufficient to maintain hydrogen fluoride in the liquid condition in the reaction zone.

Although, as pointed out above, hexamethylbenzene in the solid state reacts readily with $BF_3$ and HF, it is sometimes necessary or more convenient to employ a solution of hexamethylbenzene in a diluent or solvent, for example, an aromatic hydrocarbon such as benzene or methyl-substituted benzenes, such as toluene, xylenes, mesitylene, tetramethylbenzenes or the like; or in solution in an aliphatic hydrocarbon or mixtures containing aliphatic hydrocarbons, for example, pentane, petroleum ether, n-heptane, petroleum naphthas and the like. The above-mentioned solvents are merely illustrative and it will be understood that any inert solvent or diluent can be employed, i. e. a solvent or diluent which does not react with the hexamethylbenzene, $BF_3$ or HF under the conditions to which hexamethylbenzene is subjected to form a complex compound.

The hexamethylbenzene.$BF_3$.HF complex may be formed merely by agitating hexamethylbenzene with an excess of HF and $BF_3$ at room temperature and then pumping off the excess reagents. One method of preparing a solution of this complex in HF is to pass $BF_3$ into a slurry of hexamethylbenzene in excess HF until no further absorption of $BF_3$ occurs. In another method of preparing the complex compound of this invention, a bed of solid hexamethylbenzene is maintained in a tower, liquid HF is trickled downwardly through the bed and a gas mixture comprising $BF_3$ is passed upwardly through the bed, whereupon reaction ensues and the complex is withdrawn from the lower portion of the tower as a solution in liquid hydrogen fluoride.

The following preparation is illustrative of the selective production of hexamethylbenzene.$BF_3$.HF complex compound in the presence of a diluent methyl-substituted benzene and an aliphatic hydrocarbon diluent. An equimolar mixture of hexamethylbenzene and mesitylene (0.119 mol of each), 33.5 grams in all, in solution in 135 g. of n-heptane was placed in a magnetically-stirred copper reactor at the temperature of a Dry Ice-acetone bath. Hydrogen fluoride in the amount of 143 g. was then distilled into and condensed in the reactor, which was then cooled in a liquid nitrogen bath while 8.5 g. of $BF_3$ were added. The reaction mixture was stirred and allowed to warm up to about 20° C., following which stirring was discontinued and the contents of the reactor were allowed to settle for 15 minutes. The lower, predominantly hydrofluoric acid phase was discharged from the reactor. An upper, predominantly hydrocarbon phase remained in the reactor. A clean-cut separation of the two phases was readily obtained because of their marked differences in color and viscosity. In order to determine the composition of the hydrocarbons in the predominantly acid layer, this layer was mixed with ice and the resultant aqueous acid phase was extracted wih n-pentane to recover the liberated hydrocarbons. The hydrocarbons derived from the predominantly hydrocarbon layer in the reactor and from the acid phase were separately fractionated through a column of 30 theoretical plates to obtain an analysis by carbon number. Although 50 mol percent, each, of mesitylene and hexamethylbenzene were charged to the reactor, 81 mol percent of hexamethylbenzene and only 19 mol percent of mesitylene were found in the liquid hydrogen fluoride solution produced in the reaction and 88 mol percent of mesitylene and 12 mol percent of hexamethylbenzene were found in the predominantly hydrocarbon layer after the reaction. This indicates that hexamethylbenzene reacts selectively with $BF_3$ and HF to form an HF-soluble complex even in the presence of a relatively basic hydrocarbon such as mesitylene.

The preparative method of passing $BF_3$ into a slurry of hexamethylbenzene and liquid HF is well adapted to a study of the nature of the resultant complex compound. In this method, increments of $BF_3$ can be added to the slurry and the vapor pressure of the reaction system can be measured after each addition. By this method it can readily be determined that the complex compound which is formed is exceptionally stable and that it contains 1 mol of $BF_3$ per mol of hexamethylbenzene. In an illustrative experiment, 20 grams of hexamethylbenzene and 228.5 grams of liquid HF were placed in a magnetically-stirred copper flask and the vapor pressure of the mixture was determined at 0° C. Increments of $BF_3$ were added and the vapor pressure of the system was measured at 0° C. after each addition, the data obtained being presented in Table 1 below.

Table 1

| Mols of $BF_3$ added | Mol Fraction, $BF_3$ in HF Sol'n. | Mol Ratio: $BF_3$ to Hexamethylbenzene | Total Pressure (absolute), mm. Hg |
| --- | --- | --- | --- |
| 0 | 0 | 0 | 355 |
| .0224 | .00175 | .181 | 355 |
| .0455 | .00398 | .368 | 353 |
| .0681 | .00596 | .552 | 346 |
| .0917 | .00803 | .743 | 340 |
| .1150 | .01008 | .931 | 334 |
| .1394 | .0122 | 1.128 | 358 |
| .1638 | .0143 | 1.326 | 501 |
| .1880 | .0164 | 1.522 | 652 |

In the figure the total pressure is plotted against the mol ratio of $BF_3$ to hexamethylbenzene. The shape of the vapor pressure curve shows that the $BF_3$ is absorbed as it is added until one mol of $BF_3$ per mol of hexamethylbenzene is present. Then, as more $BF_3$ is added, the $BF_3$ partial pressure increases rapidly along the straight line according to Henry's law.

Methyl-substituted benzenes, particularly those containing two or more methyl substituents, can be selectively extracted by mixtures of liquid HF and $BF_3$, for example as described in S. N. 46,123 of Bernard H. Shoemaker, filed August 25, 1948, now abandoned in favor of Serial No. 309,400 filed September 13, 1952. The selectivity of extraction of one methyl-substituted benzene from another can be quantitatively described by means of the single plate separation factor, alpha, which can be defined as the mol ratio of two methyl-substituted benzenes in the extract (predominantly liquid HF) layer divided by their mol ratio in the raffinate (predominantly hydrocarbon) layer. In Table 2 are presented alpha values of the various methyl-substituted benzenes relative to the alpha value of p-xylene, which is adopted as the standard, since it is the first member of this homologous series to evidence appreciable basicity upon treatment with a mixture of liquid HF and $BF_3$.

Table 2

| Methyl-substituted Benzene | Alpha Relative to p-Xylene |
| --- | --- |
| Methyl- (Toluene) | (ca. .001) |
| 1,4-Dimethyl- (p-Xylene) | 1 |
| 1,2-Dimethyl- (o-Xylene) | 3 |
| 1,3-Dimethyl- (m-Xylene) | 9 |
| 1,2,4-Trimethyl- (Pseudocumene) | 18 |
| 1,2,3-Trimethyl- (Hemimellitene) | (ca. 18) |
| 1,2,4,5-Tetramethyl- (Durene) | 60 |
| 1,2,3,4-Tetramethyl- (Prehnitene) | 85 |
| 1,3,5-Trimethyl- (Mesitylene) | 1,400 |
| 1,2,3,5-Tetramethyl- (Isodurene) | 2,800 |
| Pentamethyl- | 4,350 |
| Hexamethyl- (Mellitene) | 44,500 |

The relative basicity of hexamethylbenzene towards HF-$BF_3$ mixtures is astounding upon comparison with the basicity of the other methyl-substituted benzenes and is reflected in the ease with which it forms the complex compound and the relatively high stability of the complex compound.

The properties of the hexamethylbenzene.HF.$BF_3$ complex make it suitable for many practical applications. It is especially valuable as a catalyst to be used for certain types of alkylation and polymerization reactions which ordinarily are catalyzed by small amounts of HF-$BF_3$. In the form of the hexamethylbenzene complex an equimolar mixture of HF and $BF_3$ may be transported or stored conveniently under relatively low pressure and may be added accurately in controlled amounts to a reaction mixture. Also, because of its relatively high stability, the hexamethylbenzene complex will maintain the low concentration of HF and $BF_3$ necessary in some processes for catalyzing a desired reaction and yet will avoid undesirable side-reactions induced by high catalyst concentrations.

The hexamethylbenzene complex is also useful in catalyzing reactions requiring an equimolar mixture of HF and $BF_3$ in high concentrations. The HF and $BF_3$ are transported to the site of operations in the form of the easily handled hexamethylbenzene complex and are there generated in the free condition by heating the complex to temperatures between about 200 and about 275° C. The evolved HF and $BF_3$ are passed into the reaction mixture and the hexamethylbenzene is recovered for reuse. Hexamethylbenzene is a very stable compound and, at the temperatures required for the substantial dissociation of its HF-$BF_3$ complex, will not crack or disproportionate even in the presence of HF and $BF_3$.

The hexamethylbenzene.$BF_3$.HF complex compound, particularly in solution in excess liquid HF, may be employed as a solvent for the selective extraction of aromatic hydrocarbons from petroleum stocks which also contain saturated hydrocarbons. The aromatic hydrocarbon may be recovered from the solvent by contacting the extract phase with a nonaromatic counter-solvent such as petroleum ether or ligroin. Of all the possible alkylbenzene-$BF_3$-HF complexes, the most suitable for use as an aromatic extractant is the hexamethylbenzene.$BF_3$.HF complex compound. Since hexamethylbenzene is the most basic of all the methylbenzenes it cannot be replaced from its complex compound with $BF_3$ and HF by any other methylbenzene which is present in the stock charged to the extraction process. Also, since hexamethylbenzene contains no ethyl or higher alkyl substituent groups which we have found to disproportionate readily in the presence of liquid HF and BF₃, hexamethylbenzene will not be involved in alkyl transferring reactions in the course of the extraction operation.

In a typical application of the aromatic extractive properties of the hexamethylbenzene.BF₃.HF complex compound, a charging stock comprising principally aromatic and saturated hydrocarbons, which may be any low sulfur petroleum fraction up to and including a gas oil, is passed into the lower portion of an extraction column wherein it passes through an extract layer and is countercurrently contacted with a descending stream of hexamethylbenzene.BF₃.HF dissolved in excess liquid HF which is introduced into the upper portion of the extraction column. Preferably, the mol ratio of hexamethylbenzene to BF₃ in the solvent is 1.0 and the mol ratio of HF to BF₃ is maintained between about 2 and about 16, preferably between about 4 and about 12. Extraction may be effected at temperatures between about 10° C. and about 50° C. under pressure sufficient to maintain a substantial proportion of the solvent in the liquid phase, usually pressures between about 0 and about 50 p. s. i. g. An interesting and valuable feature of the complex compound-HF mixed solvent is that the complex compound of hexamethylbenzene, BF₃ and HF substantially lowers the vapor pressure of liquid HF, thus facilitating extraction at relatively low pressures, compared to the pressures which would necessarily be employed when HF alone is employed as the solvent. The ability to operate the extraction system at relatively low pressure appreciably reduces the cost of the extraction equipment. After contact with the descending acidic solvent stream, the dearomatized or partially dearomatized hydrocarbons are withdrawn from the upper portion of the extraction column and sent to a raffinate stripper or to a neutralization zone to remove any small remaining amount of HF. The extract layer is removed from the bottom of the extraction column and introduced into the upper portion of a second extraction column wherein its is countercurrently contacted with a nonaromatic counter-solvent having a different boiling range from that of the hydrocarbon charging stock fed to the first extraction column. The nonaromatic counter-solvent may be saturated, i. e., a paraffinic or cycloparaffinic, hydrocarbon or hydrocarbon mixture, e. g., liquefied, normally gaseous paraffins such as propane, n-butane, isobutane; normally liquid saturated hydrocarbons, such as n-pentane, isopentane, n-hexane, 2-methylpentane, methylcyclopentane, dimethylcyclopentanes, cyclohexane, saturated naphthas and the like. The counter-solvent extraction operation may be effected at temperatures between about 10° C. and about 50° C. and pressures sufficient to maintain the liquid phase. A solution of aromatic hydrocarbons in the counter-solvent is withdrawn from the upper portion of the second extraction column and passed to a fractionating column. Here the aromatic hydrocarbons and counter-solvent are separated by fractional distillation. The counter-solvent passes overhead together with dissolved HF and is recycled to the lower portion of the second extraction column. The aromatic hydrocarbon fraction is aftertreated to remove any residual HF by conventional techniques, for example, neutralization with caustic, absorption in NaF, defluorination by the use of etched aluminum surfaces, bauxite, lime, etc. The HF-complex compound solvent is withdrawn from the lower end of the second extraction column and recycled to the first extraction column.

The above-described extraction process may most profitably be applied to the separation of aromatic hydrocarbons from the gasoline boiling range material produced in catalytic cracking or hydroforming. It may also be used to dearomatize heater oils and light gas oils to produce higher quality burning oils or diesel oils. It will be apparent that the extraction equipment may be of any variety conventionally employed or known and that the countercurrent process and equipment described above are purely illustrative. Thus, it will be apparent that in a batch extraction system the solvent could be formed in situ by mixing the charging stock, hexamethylbenzene, HF and BF₃, effecting contacting, and then allowing the mixture to settle in the same or a different vessel.

From the above description of the preparation of hexamethylbenzene.BF₃.HF complex, it will be apparent that the preparative methods may be employed as a means of selectively removing BF₃ from gas streams containing the same, for example from gas streams derived from processes in which BF₃ is employed as a catalyst, such as vent gases from polymerization, cracking, alkylation or other reactions in which BF₃ has been employed at a catalytic medium. In order to regenerate BF₃ from its complex with hexamethylbenzene, the complex is subjected to pyrolysis, usually at temperatures between about 200° C. and about 275° C. Reduced pressures and the removal of BF₃ as formed facilitate the pyrolysis process. The pyrolysis may also be facilitated by the employment of stripping gases which strip out the BF₃ as formed and which can be readily separated from BF₃ by fractional liquefaction or otherwise. Thus, for example, hot HF as a vapor or gas, for example, at temperatures between about 150° C. and about 225° C., may be passed through the complex in the decomposition zone and thereafter separated from the BF₃ which it has stripped by fractional liquefaction, following which the HF can be reheated and recycled to the pyrolysis zone.

This application is a continuation of application Serial No. 146,776 filed by us on February 28, 1950, now abandoned.

Having thus described our invention, what we claim is:

1. As a new composition of matter, a complex compound having the molecular formula hexamethylbenzene.BF₃.HF.

2. As a new composition of matter, a solution of a complex compound having the molecular formula hexamethylbenzene.BF₃.HF in liquid hydrogen fluoride, said liquid hydrogen fluoride being in excess of the amount required to form said complex compound.

References Cited in the file of this patent

UNITED STATES PATENTS 2,480,939    Lee et al. _____ Sept. 6, 1949

OTHER REFERENCES

Clement et al.: Compte rend., volume 206, pp. 610–612 (1938).